June 21, 1938. W. L. MORGAN 2,121,041
MARKED MATERIAL AND PROCESS OF PRODUCING THE SAME
Original Filed Dec. 23, 1933
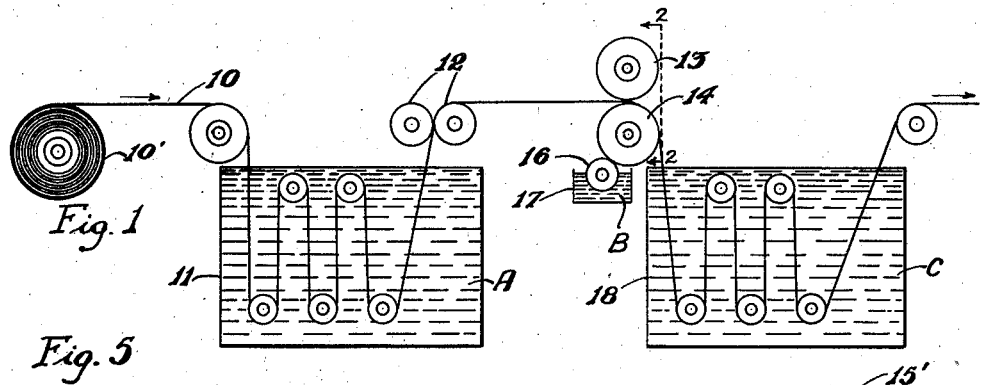
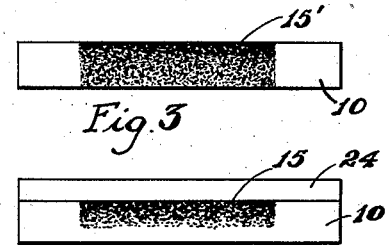
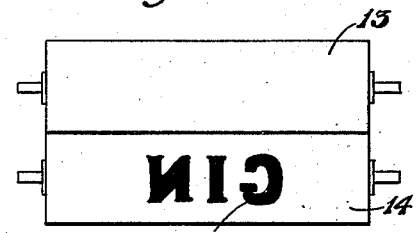
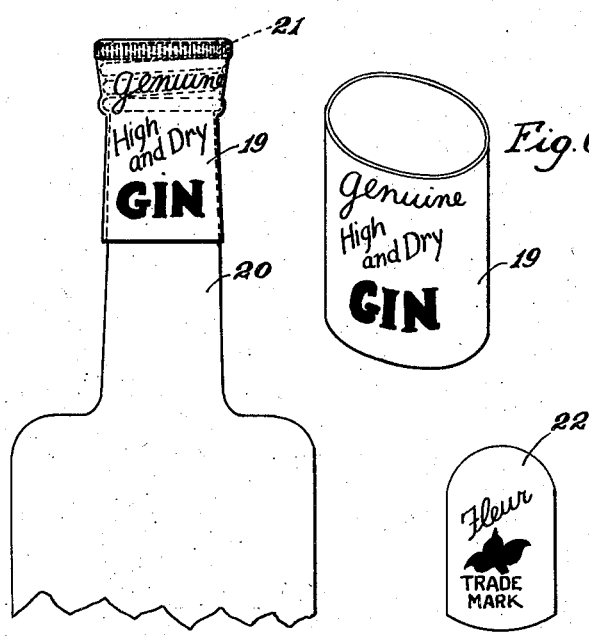
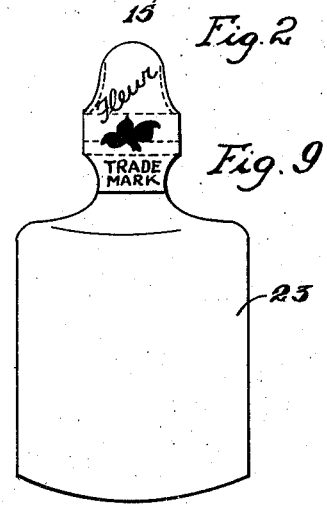
INVENTOR
Willard L. Morgan
BY
Watson, Bristol, Johnson & Leavenworth
ATTORNEYS Patented June 21, 1938

2,121,041

UNITED STATES PATENT OFFICE 2,121,041

MARKED MATERIAL AND PROCESS OF PRODUCING THE SAME

Willard L. Morgan, Hammond, Ind., assignor to Sylvania Industrial Corporation, New York, N. Y., a corporation of Virginia Application December 23, 1933, Serial No. 703,859
Renewed January 13, 1938

15 Claims. (Cl. 41—41)

This invention relates to a method for the manufacture of marked material and to the article produced thereby. More particularly, it relates to the marking of non-filamentary bodies such, for example, as sheets, films, bands, tubes and hollow bodies of non-fibrous and colloidal material swelling in water.

Prior methods of marking such materials have entailed applying to the surface an ink comprising an opaque pigment or coloring matter suspended or dissolved in an organic solvent which is incapable of swelling the colloidal material and consequently there has been little or no penetration of the pigment or coloring matter beneath the surface of the material. As a result, the adherence of such inks is imperfect and the indicia may be scratched off in handling or may be dislodged by immersing the material in water.

It is a general object of the invention to provide non-filamentary bodies comprising non-fibrous and colloidal material swelling in water with novel markings contrasting therewith as regards color and/or transparency and characterized by being insoluble in water and resistant to damage by handling or abrasion and difficult to alter or remove, and processes for producing the same.

Another and specific object of the invention is to provide a shrinkable container closure comprising a colloidal material swelling in water with a novel indicium adapted to inhibit adulteration of the contents of the container and to indicate the origin or nature of the contained merchandise, and a process of producing such a closure.

Another object of the invention is to provide a method of marking non-filamentary bodies comprising a colloidal material swelling in water with indicia contrasting therewith, said process being characterized by steps resulting in the formation, within the body of the material, of a contrasting substance insoluble in water.

Other objects of the invention will in part be obvious and will in part appear hereinafter.

The invention accordingly comprises the several steps and the relation of one or more of such steps with respect to each of the others, and the article possessing the features, properties and the relation of elements which are exemplified in the following detailed disclosure and the scope of the application which will be indicated in the claims.

For a more complete understanding of the nature and objects of the invention, reference should be had to the accompanying drawing, in which:

Fig. 1 is a diagrammatical representation of a simple means for carrying out one modification of the process of the invention.

Fig. 2 is a detailed view of the rolls 13 and 14 shown in Fig. 1 taken along the line 2—2, looking in the direction of the arrows.

Fig. 3 is a view in section of a material marked in accordance with one embodiment of the present process.

Fig. 4 is a view in section of a material marked in accordance with another embodiment of the process.

Fig. 5 is a representation of a sheet of material bearing contrasting indicia produced in accordance with the present invention.

Fig. 6 is a perspective view of a shrinkable container closure in the form of a band bearing contrasting indicia and comprising one embodiment of the novel article of this invention.

Fig. 7 shows the closure of Fig. 6 shrunk into place on a bottle.

Fig. 8 is a representation of a shrinkable container closure in the form of a cap bearing contrasting indicia and comprising another embodiment of the article of the invention.

Fig. 9 shows the closure of Fig. 8 shrunk into place on a bottle.

Generally speaking, the present method comprises treating a colloidal material swelling in water by impregnating it in predetermined areas with an opaque inorganic compound insoluble in water and contrasting with said material.

The present process is particularly applicable to marking sheets, films, bands, tubes or hollow bodies comprising a non-fibrous colloidal material swelling in water such, for example, as non-fibrous cellulosic material such as cellulose hydrate, hydroxy-alkyl derivatives of cellulose; and gelatine, casein and the like. Such materials when utilized in this process may be transparent, translucent or opaque; colorless or slightly tinted, dyed, or otherwise colored as may be desired for the purpose for which they are to be employed. Further, the materials may be previously impregnated with materials or substances designed to impart thereto a silky lustre, matte or the like finish.

More specifically, the process of the invention consists in treating a non-fibrous colloidal material swelling in water sequentially with water-soluble inorganic substances capable of reacting with each other to form an opaque, inorganic compound insoluble in water and contrasting with said material. The material is treated with such reactants in such a manner that the insoluble product is precipitated inside the body of the material within areas predetermined by the point of application of at least one of the substances. The insoluble opaque inorganic compound is formed in situ as a colloidal dispersion within the body of the material and may be opaque, colored or white as desired, to afford sufficient contrast to the material. In its preferred form, using a light colored, opaque colloidal material, the insoluble inorganic compound is opaque and preferably darkly colored to afford maximum contrast to the material.

In the preferred practice, the reactants used to produce the insoluble product are applied to the material in solution in a suitable solvent having a swelling action on the respective non-fibrous colloidal material to be marked. Suitable solvents for use with and adapted to swell the non-fibrous colloidal material of the class described herein comprise water or substances miscible therewith such, for example, as the lower monohydric aliphatic alcohols such, for example, as ethyl alcohol; the polyhydric aliphatic alcohols such, for example, as glycerine, di- or tri-ethylene glycol; triethanolamine and the like, or mixtures of one or more of these solvents.

In its simplest embodiment, the process requires the use of two inorganic reactants which shall be referred to hereinafter as reactants A and B, and the solutions thereof will be designated respectively as solutions A and B. In general, in so far as the chemical nature of the reactants A and B is concerned, it is not material in which order the solutions containing the reactants A and B are applied to the material.

In the now preferred procedure, the first applied solution, for example, solution A, consists of a relatively dilute solution and the second applied solution, for example, solution B, consists of a relatively concentrated and preferably saturated, solution. It has been found desirable, after treating the material with the first solution, to allow sufficient time for the solvent to diffuse through the surface and carry the reactant into the body of the material. On the other hand, it is desirable to limit the diffusion of the second solution in order to prevent the "bleeding" of the deposit beyond predetermined areas. This may be effected by removing the surface liquid resulting from treating the material with the first solution so that the reaction occurs only with the absorbed solution, and thereafter applying the second solution in predetermined design. The surplus of the first solution may be removed by the use of suitable blotting felts, doctor blades, squeegee rolls or other suitable means, as by passing a blast of warm air thereover and the second solution may be applied by the use of a raised design, a stencil or the like. As the second solution diffuses within the areas treated with the first solution, the insoluble opaque product is produced within the body of the material, as shown in Fig. 3.

By way of illustrating the steps of the process of the invention, but not by way of limitation, there may be given the following examples of reactants and products thereof suitable for use in the process:

| | Reactant A | Reactant B | Product | Color |
|---|---|---|---|---|
| 1 | Tannic acid | Ferric chloride | Ferric tannate | Purple black. |
| 2 | Sodium ferrocyanide | Ferric chloride | Ferric-ferrocyanide | Blue. |
| 3 | Sodium silicate | Cobalt chloride | Cobalt silicate | Light blue. |
| 4 | Sodium sulfide | Ferric chloride | Ferric sulfide | Black. |
| 5 | Sodium sulfide | Lead acetate | Lead sulfide | Brown. |
| 6 | Sodium sulfide | Cadmium chloride | Cadmium sulfide | Light yellow. |
| 7 | Sodium sulfide | Mercuric nitrate | Mercuric sulfide | Black. |
| 8 | Sodium sulfide | Cupric sulfate | Cupric sulfide | Brown-black. |
| 9 | Sodium sulfide | Silver sulfate | Silver sulfide | Black. |
| 10 | Sodium sulfide | Nickel nitrate | Nickel sulfide | Deep black. |

Referring now to Fig. 1, an indicium may be produced on a material of the class described, such, for example, as a transparent sheet of cellulose hydrate, by passing the material in the form of an endless web 10 through a vat 11 containing, for example, a solution A, consisting of 1.5 parts of tannic acid in 98.5 parts of water, the traverse being sufficient for a one minute immersion. From the bath, the sheet material is passed between squeegee rollers 12 which remove the surplus surface liquid and then, without permitting the treated material to dry, between a pair of rollers 13 and 14, roller 14 being provided on the arcuate surface with a suitable raised design 15 in rubber, for example, as shown in Fig. 2. The design 15 is wetted by a roll 16 which dips into a second solution B, of ferric chloride, preferably held in a trough 17, the solvent consisting, for example, of 20 parts water and 80 parts glycerine. Thereafter the material is passed into a bath 18 of suitable solvent C, e. g. water, wherein the unreacted portions of reactants A and B are washed out of the material.

As shown in Fig. 3, the precipitate of ferric tannate produces an intense black design 15' which contrasts well with the sheet material 10. If desired, the marked material may be passed subsequently through a solution of a suitable softening agent, such, for example, as glycerine, or otherwise treated and/or dried. The deposit comprising the design 15' may extend through the full thickness of the material as shown in Fig. 3, or through only part of the thickness thereof as shown in Fig. 4.

In Fig. 1 the material is represented as being taken from a finished roll 10', but it is obvious that in marking sheets and tubing produced in a continuous manner, the material may be subjected to the process of marking above described during the course of manufacture, preferably between the steps of purifying and drying the material.

If desired, the process may be applied to the marking of a length of hollow tubing formed from a material of the class described. The tubing may, for example, be formed by extruding a suitable viscose solution from an annular orifice. The indicia are formed thereon at predetermined spaced intervals by the process described above. The resulting legend-bearing tubing may be used for the production of sausage casings or it may be divided into narrow bands 19, as illustrated in Fig. 6, by cutting the same between the spaced indicia.

Such legend-bearing bands are admirably adapted for use as container closures. As shown in Fig. 7, the band 19 in a tumefied state is slipped over the neck of the container, e. g. a bottle 20 having a screw cap 21, the band being disposed so that its top is adjacent or slightly overlapping the top of the screw cap 21. Upon drying, the tumefied band 19 shrinks due to the loss of water and conforms generally to the shape of the container neck and cap. The top of the screw cap 21 is not wholly covered by the band so that the printing which such metal caps normally carry will not be obscured by the band. The indicia-bearing closure band effectively hinders adulteration of the contents and may serve to indicate origin or nature of the merchandise.

In marking by a continuous process the second applied solution B preferably is thickened by the addition of glycerine, dextrine, or a water-soluble resin derived from glycerine or the glycols, such, for example, as glycol borate, glyceryl tartrate, glyceryl citrate, or mixtures thereof.

The thickening agent used should not materially decrease the rate of diffusion or rate of reaction. For example, with each 100 parts of the reactant there may be used a thickened solvent consisting of 25-50 parts water and 50-75 parts glycol borate. These solutions are also suitable for half tone printing.

The process of the invention is likewise adapted for marking hollow bodies, such, for example, as shrinkable bottle caps formed of materials of the class described, for example, a bottle cap which has been formed by dipping a mandrel into a suitable gelatine solution preferably mixed with an opaque pigment, e. g. titanium oxide, and subsequently hardening the gelatine by treatment with formaldehyde or otherwise. The cap is dipped, while on the mandrel, into a solution consisting of 9 parts of sodium sulphide and 91 parts of water. The surface water is removed by suitable means and the cap is then stamped with a rubber stamp carrying a raised design, the surface of the design being wetted with a saturated solution of silver nitrate in water. The cap is thereafter washed in water to remove the unused reagents and may be glycerinated or otherwise softened and then stripped from the mandrel.

The finished legend-bearing cap 22 is illustrated in Fig. 8. When applied to a container closure, the cap shrinks upon drying and conforms generally to the shape thereof as shown on the bottle 23 in Fig. 9. The dense deposit of black silver sulphide contrasts sharply with the while opaque gelatine to produce a pleasing marking.

If it is desired to produce a design comprising two or more colors this may be accomplished by subjecting the material to two or more separate applications of the process. Alternatively, after treating the material with a given reactant A as, for example, sodium sulphide, it is treated successively, without permitting the treated material to dry, with two or more reactants B, such, for example, as ferric chloride and cadmium chloride, each of the several reactants B being applied by designs which are properly registered (i. e. displaced) with respect to one another. With the reactants mentioned, a design comprising black and yellow is produced, as shown in Fig. 5.

A similar interesting design may be produced also by using for the several reactants B several solutions of a single substance having different concentrations thereof. In this latter modification, a design made up of sharp and diffuse lines may be produced.

As shown in Fig. 4, the marked material 10 in any of its physical forms may be subsequently coated over on the design side with a suitable transparent composition 24 for the purpose of protecting the design against attempts at mechanical or chemical alteration or to provide a coating which is adhesive, lustrous, waterproof or resistant to atmospheric or other conditions, and if desired the coating may comprise a superimposed layer of the material itself.

It will be observed that by the present invention there is provided a novel and advantageous method of marking non-filamentary bodies comprising a colloidal material swelling in water. As will be observed from the examples given above, the process is applicable to various forms of said non-filamentary bodies and various reagents and solvents may be used within the scope of the invention.

The present invention further provides, as a novel article of manufacture, a marked material characterized by having a marking which is difficult to duplicate and resistant to removal by chemical or mechanical means without damaging the basic material to such an extent that the attempted removal or alteration may be easily detected. The difficulty of removal or alteration of the marking serves to discourage the pirating of valuable trade-marks, slogans, etc., and when the novel article is used as a container closure the marking inhibits adulteration of the contents or substitution of inferior products therefor.

Since certain changes in carrying out the above process, and certain modifications in the article which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for manufacturing a marked material which comprises treating a non-filamentary body formed of a colloidal material swelling in water with a dilute solution of a water-soluble, inorganic substance in a swelling agent for said material, and applying to predetermined areas of said treated body while in a swollen condition a concentrated solution of a second water-soluble, inorganic substance in a swelling agent for said material, said second substance being capable of reacting with said first substance within the body to form an opaque, inorganic compound insoluble in water and contrasting with said material.

2. A process for manufacturing a marked material which comprises treating a non-filamentary body formed of a colloidal material swelling in water with a dilute solution of a water-soluble, inorganic substance in a swelling agent for said material, and then treating said treated body while in a swollen condition in predetermined and different areas in succession with solutions having different concentrations of a second water-soluble, inorganic substance in a swelling agent for said material capable of reacting with said first applied substance within the body to form an opaque, inorganic compound insoluble in water and contrasting with said material.

3. A process for manufacturing a marked material which comprises treating a non-filamentary body formed of cellulose hydrate swelling in water with a dilute solution of a water-soluble, inorganic substance in a swelling agent for said material, and applying to predetermined areas of said treated body while in a swollen condition a concentrated solution of a second water-soluble, inorganic substance in a swelling agent for said material, said second substance being capable of reacting with said first applied substance within the body to form an opaque, inorganic compound insoluble in water and contrasting with said material.

4. A process for manufacturing a marked material which comprises treating a non-filamentary body formed of a colloidal material swelling in water with an inorganic substance dissolved in a swelling agent for said material, and applying to predetermined areas of said treated body a second inorganic substance dissolved in a solvent comprising a swelling agent for said material and a thickening agent, said second substance being capable of reacting with the first applied substance within the body to form an opaque inorganic compound insoluble in water and contrasting in color with said material.

5. A process for manufacturing a marked material which comprises treating a non-filamentary body formed of a colloidal material swelling in water with a dilute aqueous solution of a water-soluble, inorganic substance, and applying to predetermined areas of said treated body while in a swollen condition a more concentrated solution of a second water-soluble, inorganic substance, said second substance being capable of reacting with said first substance within the body to form an opaque, inorganic compound insoluble in water and contrasting with said material.

6. A process for manufacturing a marked material which comprises treating a non-filamentary body formed of a colloidal material swelling in water with a dilute solution of a water-soluble, inorganic substance in a swelling agent for said material, and applying to predetermined areas of said treated body while in a swollen condition a plurality of concentrated solutions of different water-soluble, inorganic compounds, the latter solutions being capable of reacting with said first substance within the body to form opaque, inorganic compounds insoluble in water and contrasting in color.

7. A process for manufacturing a marked material which comprises treating a non-filamentary body formed of a colloidal material swelling in water with a dilute solution of a water-soluble, inorganic substance in a swelling agent for said material, removing the surface liquid and applying to predetermined areas of said treated body while in a swollen condition a concentrated solution of a second water-soluble, inorganic substance, said second substance being capable of reacting with said first substance within the body to form an opaque, inorganic compound insoluble in water and contrasting with said material.

8. As an article of manufacture, a shrinkable container closure formed of a colloidal material and bearing an indicium in the form of a deposit consisting entirely of an opaque, insoluble, inorganic compound, the deposit existing substantially within the body of the material.

9. As an article of manufacture, a shrinkable container closure formed of cellulose hydrate and bearing an indicium in the form of a deposit consisting entirely of an opaque, insoluble, inorganic compound, the deposit existing substantially within the body of the material.

10. As an article of manufacture, a shrinkable container closure formed of a colloidal material and bearing an indicium in the form of a deposit consisting entirely of a plurality of opaque, insoluble, inorganic compounds contrasting in color, the deposit existing substantially within the body of the material.

11. As an article of manufacture, a shrinkable container closure formed of a colloidal material and bearing an indicium in the form of a deposit consisting entirely of an opaque, insoluble, inorganic compound of varying shades, the deposit existing substantially within the body of the material.

12. As an article of manufacture, a shrinkable container closure formed of a transparent colloidal material and bearing an indicium in the form of a deposit consisting entirely of an opaque, insoluble, inorganic compound, the deposit existing substantially within the body of the material.

13. As an article of manufacture, a shrinkable container closure formed of an opaque colloidal material and bearing indicia in the form of a deposit consisting of an opaque, insoluble, inorganic compound, the deposit existing substantially within the body of the material.

14. As an article of manufacture, a shrinkable container closure formed of gelatine and bearing an indicium in the form of a deposit consisting entirely of an opaque, insoluble, inorganic compound, the deposit existing substantially within the body of the material.

15. As an article of manufacture, a shrinkable container closure formed of a hydroxy alkyl derivative of cellulose and bearing an indicium in the form of a deposit consisting entirely of an opaque, insoluble, inorganic compound, the deposit existing substantially within the body of the material.

WILLARD L. MORGAN.